United States Patent [19]

Yates

[11] 4,354,126
[45] Oct. 12, 1982

[54] DYNAMOELECTRIC MACHINE WITH A PERMANENT MAGNET ROTOR HAVING LAMINATED POLES

[75] Inventor: William W. Yates, Lima, Ohio

[73] Assignee: Westinghouse Electric Corp., Pittsburgh, Pa.

[21] Appl. No.: 186,882

[22] Filed: Sep. 12, 1980

[51] Int. Cl.³ .................................................. H02K 21/12
[52] U.S. Cl. ...................................... 310/156; 310/214; 310/217; 310/261
[58] Field of Search ................... 310/10, 52, 152, 154, 310/156, 256, 214–218, 42, 261, 264, 265; 277/25, 13; 29/598

[56] References Cited

U.S. PATENT DOCUMENTS

| | | | |
|---|---|---|---|
| 2,059,518 | 11/1936 | Harley | 171/209 |
| 2,456,982 | 12/1948 | Moore | 310/216 |
| 2,876,371 | 3/1959 | Wesolowski | 310/217 |
| 2,928,932 | 3/1960 | Huggins et al. | 310/217 |
| 2,930,916 | 3/1960 | Scanlon et al. | 310/156 |
| 3,391,294 | 7/1968 | Moxie et al. | 310/214 |
| 3,492,520 | 1/1970 | Yates | 310/261 |
| 3,671,788 | 6/1972 | Knudson et al. | 310/156 |
| 4,117,360 | 9/1978 | Richter | 310/183 |
| 4,139,790 | 2/1979 | Steen | 310/156 |
| 4,260,921 | 4/1981 | Silver | 310/156 |

FOREIGN PATENT DOCUMENTS 55-29231  3/1980  Japan .................................... 310/216

OTHER PUBLICATIONS

Bailey et al., Air Force Tech Report AFAPL-TR-76-8, Mar. 1976.

Primary Examiner—Laramie E. Askin
Assistant Examiner—D. L. Rebsch
Attorney, Agent, or Firm—G. H. Telfer

[57] ABSTRACT

A dynamoelectric machine having a permanent magnet rotor consisting of a stack of alternating magnetic and structural non-magnetic laminations held together with bead welds on the outside diameter of the rotor at stator slot pitch intervals with non-magnetic wedge retention of the magnets.

6 Claims, 5 Drawing Figures

DYNAMOELECTRIC MACHINE WITH A PERMANENT MAGNET ROTOR HAVING LAMINATED POLES

BACKGROUND AND SUMMARY OF THE INVENTION

This invention relates to dynamoelectric machines, and methods of their construction, that include premanent magnets assembled with laminated pole members.

Available permanent magnets, such as rare earth magnets, have made it attractive to construct dynamoelectric machine rotors with permanent magnets rather than wound coils for providing field excitation. Key advantages of the permanent magnet rotors are reductions in weight and size which are particularly important in applications such as aircraft.

Aircraft generators have traditionally been AC synchronous machines usually with a brushless excitation system on the rotor involving a rotating rectifier construction with a field winding fed by a separate exciter generator. Constructing the rotor of permanent magnets eliminates the exciter generator, the field winding, and related rotating rectifier. This need for a small auxiliary permanent magnet generator to supply start-up power is also eliminated. Aircraft generators are normally driven at a constant speed by means of a hydraulic speed conversion system operating off of a variable speed engine. Now it has become desirable to operate aircraft generators at a variable speed, eliminating the hydraulic speed conversion system, and to develop a constant frequency electrical output by electronic power conversion systems such as a cycloconverter system. Such a power conversion system can also permit operation of the generator in a reverse mode to obtain motor operation useful for starter-generator systems on aircraft engines or flywheel energy storage and retrieval. A brushless wound field machine is not as attractive for this purpose because it requires an exciter generator whose size has to be increased for capability of operating at decreased speed.

Another area of interest for application of machines with permanent magnet rotors is in brushless DC motors. These offer advantages in efficiency and in size and weight as opposed to wound rotors. The opportunity is available to obtain low rotor inertia, using rare earth magnets, in actuators for control surfaces in aircraft or other applications where quick response is required. Electric rather than hydraulic actuators are therefore made possible and provide an opportunity for totally electric aircraft systems.

One construction for a permanent magnet rotor consists of the magnets having their magnetic axes radially disposed with the magnet surface exposed to the machine air gap. The magnets are anchored, such as by an adhesive bonding material, to an underlying ferrous member which conducts magnetic flux from pole to pole. While this is a relatively simple construction, it is not suitable for high speed operation because of the weak structure of the magnets themselves and the joints at which they are bonded to the ferrous member. Another disadvantage, when rare earth magnets are used, is the low flux density in the air gap resulting from the normal characteristics of rare earth magnets which have a relatively low flux density-high coercive force characteristic. Therefore, this type of construction does not use the magnets effectively. Another disadvantage, with magnets that are electrically conductive, results from the stator slot openings which cause a high frequency variation in the magnetic flux on the surface of the magnet as it rotates resulting in high eddy current losses.

To obtain a higher strength structure, the preceding described rotor can be modified to contain the magnets inside a high strength enclosure. Such an enclosure normally requires ferrous material radially above the magnets to conduct the flux to the air gap and non-ferrous material between the magnets to avoid magnetically shorting them. This type of structure still does not use rare earth magnets effectively, has high eddy current losses in the solid enclosure and, also, is difficult to manufacture because it requires weldments between ferrous and non-ferrous materials.

A form of high strength enclosure construction which attempts to address some of these problems is shown in FIG. 1. It is described in Technical Report AFAPL-TR-76-8, March 1976, "150 KVA Samarium Cobalt USCF Starter Generator Electrical System, Phase 1 ," by General Electric Company, Aircraft Equipment Div., Binghamton, New York, for Air Force Aeropropulsion Laboratory, Air Force Wright Aeronautical Laboratories, Air Force Systems Command, Wright Patterson Air Force Base, Ohio 45433. Here, elongated, rectangular cross-section, magnets 10 are disposed to run in radial planes through the rotor core. The intervening core material is of magnetic steel laminations or lamination segments 12. The periphery of the rotor comprises non-ferrous metal strips 14 running over the face of the permanent magnets. The strips 14 are welded together with partial cylindrical ferrous steel members 16 over the pole region. The generated magnetic flux paths 18 result from an orientation of the magnetic axis of the magnets circumferentially in the rotor. Thus, the flux path is out of one side of a magnet 10 into the ferrous pole piece adjacent to it and then turns radially into the machine air gap. The flux returns from the air gap through an adjacent pole down into the other side of the magnet. Because the area of the magnet can be extended radially, the flux from one magnet can be compressed into a relatively small area of the ferrous material in the pole at the air gap. This utilizes the magnet material much more effectively than the structure previously referred to. However, the disadvantages of high eddy current losses and difficulty of manufacture remain.

Various aspects of permanent magnet rotor construction in accordance with the prior art, including some features as discussed above as well as others, and various aspects of permanent magnet rotor application are described in the following representative patents: Harley U.S. Pat. No. 2,059,518, Nov. 3, 1936; Yates U.S. Pat. No. 3,492,520, Jan. 27, 1970; Knudson et al. U.S. Pat. No. 3,671,788, June 20, 1972; Richter U.S. Pat. No. 4,117,360, Sept. 26, 1978; and Steen U.S. Pat. No. 4,139,790, Feb. 13, 1979.

The present invention achieves the multiple objectives of providing a permanent magnet rotor in a high strength construction, with low eddy current losses, effective utilization of permanent magnets, and complete containment of the magnets in an economically manufactured structure. Briefly, the rotor structure comprises a core of a plurality of stacked laminations that include predominantly magnetic laminations that have interspersed among them non-magnetic laminations for structural strength. The magnets are located in radial planes running longitudinally through the core and have a circumferential magnetic field orientation for effective magnet usage. The magnets are secured by wedges extending longitudinally through the core at the outer periphery with the wedges being of non-magnetic material that is mechanically locked in place within laminations while the outer edges of the laminations between wedges form pole members and are exposed to the air gap. A plurality of bead welds extend longitudinally over the surface of the core to secure the laminations into a unit while minimizing the surface area of the core that is shielded from the air gap. In a preferred form of the invention, the bead welds securing the rotor laminations are coordinated with the stator slot pattern such that they are spaced from each other by a distance equivalent to the stator slot pitch to minimize current flow from induced voltages in the welds.

In accordance with the method of assembly of this invention, a stack of laminations is assembled on an arbor using slots on the outside diameter of the high strength lamination with wedge-shaped locating fixtures that extend into the slots to locate and hold the magnetic laminations preparatory to welding. The bead welds are then applied to run across the length of the stack. The permanent magnets are then inserted in the slots in the stack, after welding the laminations, so as to avoid any necessary machining operation of the laminations with a magnetized magnet in place. Then nonferrous metal or high strength non-metallic wedges are inserted into the outer ends of the slots to retain the magnets without requiring welding operations. Mechanical strength is further improved by dipping the assembly in a varnish dip and then drying it.

DESCRIPTION OF THE PREFERRED EMBODIMENTS

Figure 1:
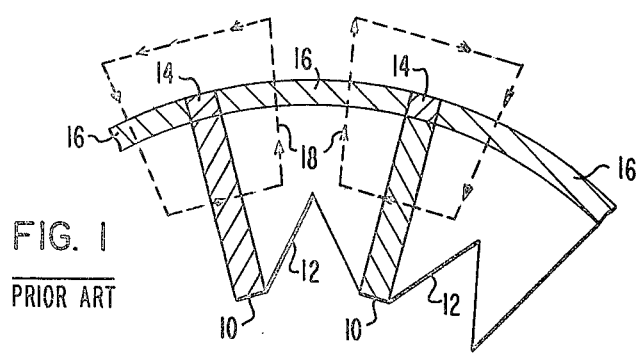
FIG. 1 is a partial cross-sectional view of a permanent magnet rotor in accordance with one embodiment of the prior art, as is discussed above.
Figure 2:
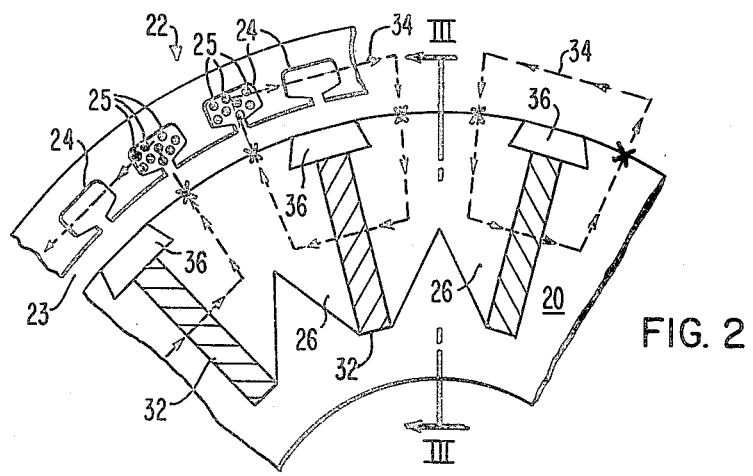
FIG. 2 is a partial cross-sectional view of a dynamoelectric machine in accordance with an embodiment of the present invention.
Figure 3:
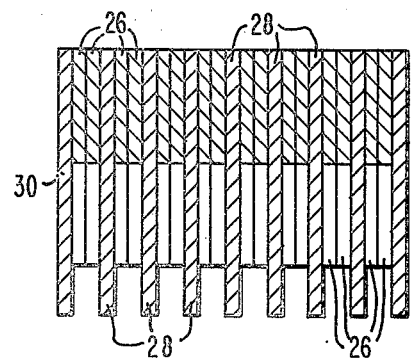
FIG. 3 is a partial longitudinal cross-section of a dynamoelectric machine rotor generally in accordance with a view along line III—III of FIG. 2; and, FIGS. 4 and 5 are plan views of lamination elements of the rotor of FIGS. 1 and 2.
Figure 4:
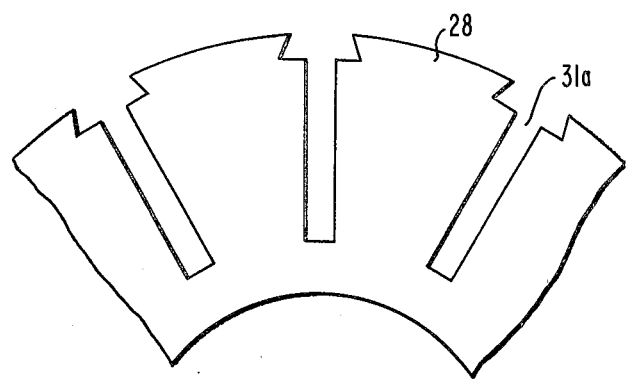
Figure 5:
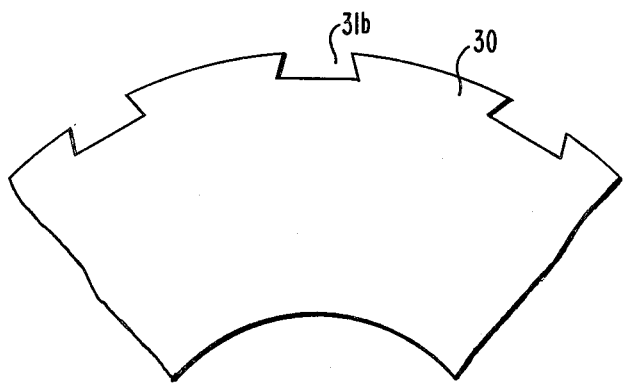

Referring to FIG. 2 of the drawings, a dynamoelectric machine is shown with a permanent magnet rotor 20 in inductive relation with a normal stator 22 containing slots 24 and coil windings 25, with air gap 23 therebetween. The rotor 20 comprises a lamination structure including ferrous laminations 26 that are in stacked relation with non-ferrous structural laminations. As shown in FIG. 3, non-magnetic structural laminations 28 are interspersed in the core structure after about every two magnetic laminations 26. There are also provided non-magnetic end laminations 30. The magnetic laminations 26 are preferably lamination segments as shown in FIG. 2. The non-magnetic structural laminations 28 are continuous arcuate members having slots 31A for magnet and wedge location as shown in FIG. 4. The end laminations 30, as shown in FIG. 5, include tapered shallow slots 31B for wedges for securing the elements together.

Referring again to FIG. 2, permanent magnets 32 are located on radial planes extending longitudinally through the core (in slots 31A of laminations 28) with a circumferential magnetic axis so as to produce the indicated flux paths 34. The permanent magnets 32 may be of rare earth type or other permanent magnet material.

The laminations are secured together by bead welds extending longitudinally on the core periphery (indicated by the small x's on FIG. 2), preferably in a depression thereof so as not to extend into the air gap 23. These bead welds are preferably spaced the same distance as the stator slots 24 for lower induced voltages.

The permanent magnets 32 are disposed within the slots 31A in the laminated structure with non-ferrous metal or organic wedges 36 driven in place, in the upper ends of slots 31A as well as the slots 31B in the end laminations 30, to lock them in without requiring any welds between the wedges 36 and the adjacent lamination material. The intervening poles are exposed to the air gap 23 so as to utilize the magnetic field more effectively.

The number of magnetic laminations 26 to non-magnetic laminations 28 is not critical. The apparent disadvantage of this structure in using part of the area normally used for magnetic steel for non-magnetic structural steel, which would tend to saturate the steel resulting in the need for more exotic magnetic steels or the use of lower effective air gap densities, is, in comparison to wound field mechanics, not a disadvantage. The magnetic sections that limit magnetic flux on a wound field machine are usually much thinner than the polar surface on the rotor that is exposed to the air gap. Thus, for equivalent air gap densities in this structure, a normal steel can be used to preserve the intended economy of the structure.

In assembly, an arbor or fixture is used on which to stack the laminations 26, 28 and 30 using the slot pattern on the outside diameter of the high strength laminations with wedge-shaped locating fixtures shaped in the form of the ultimately used wedges but with extensions into the slots to locate and hold the magnetic laminations preparatory to welding. After the non-magnetic and magnetic laminations, or lamination segments of the latter, have been stacked together, the structure is welded. Weld beads using TIG or other appropriate methods are run across the length of the stack at least one per pole. The magnetic and non-magnetic material should be selected to be materials such as Hipernik (50% nickel/steel alloy) and Inconel alloy, respectively, in order to obtain a satisfactory weld. Sufficient weld depth without raised material can be obtained by punching a depression in each lamination for the weld or by welding after grinding the outside diameter to an appropriate configuration size. Bead welds are provided at a spacing that is equal to the stator slot pitch so all voltages induced in the welds are in phase and currents do not flow. It is desirable that the width of the welds be held to a minimum to minimize local eddy currents in the welds caused by perturbation in the airgap flux from the stator slot openings.

Premagnetized magnets 32 can be inserted in the slots in the stack at the last possible manufacturing stage to avoid machining with a magnetized magnet in place. Non-ferrous metal or high strength non-metallic wedges 36 shaped as shown in FIG. 2 are then inserted into the outer slots to retain the magnets. These operations can be followed by a subsequent varnish dip and bake to avoid movement of the magnets. For high speed operation, where the varnish may not give sufficient mechanical retention to prevent magnet motion, it must be assured that the magnet is situated against the wedge either by forcing it there during assembly or providing spacers under the wedge.

The invention has been successfully demonstrated in a permanent magnet generator rotor of a diameter of 3.0 in. that was run on test equipment at speeds up to a maximum of 36,000 rpm. Structural failure only occurred at the maximum speed where the wedges were of non-metallic material. With aluminum wedges, no adverse effects were found even at the maximum test speed. The tests demonstrated the suitability of the design for aircraft engine drives designed for a maximum speed of 26,250 rpm.

Thus, there has been described an improved permanent magnet rotor, and method of making it, that achieves the objectives of high strength, while utilizing magnets effectively in an easily manufactured structure. It will be apparent that certain variations and modifications may be made from the specific embodiment as shown within the general teachings of this invention.

I claim:

1. A dynamoelectric machine comprising:
    a stator and a rotor in a mutually inductive rotation with an air gap therebetween;
    said rotor comprising a core of a plurality of stacked laminations including magnetic laminations and non-magnetic structural laminations interspersed among said non-magnetic laminations as one proceeds longitudinally through said core;
    said rotor core having a plurality of permanent magnets extending therethrough producing a plurality of magnetic flux paths circumferentially disposed about the periphery of said core, said plurality of permanent magnets each having a rectangular cross-section and each having major surfaces oriented in a substantially radial plane;
    each of said permanent magnets being secured against radially outward movement by a wedge extending longitudinally through said core at the outer periphery thereof, said wedges being of non-magnetic material and mechanically locked in place within said laminations while said radially outer edges of said laminations between wedges are exposed;
    a plurality of bead welds extending longitudinally over the surface of said core to secure said laminations into a unit while minimizing the surface area of said core that is shielded from the air gap.

2. A dynamoelectric machine in accordance with claim 1 wherein:
    said non-magnetic structural laminations through which said permanent magnets extend are each a circular element having slots for accommodating said magnets and for accommodating and locking said wedges; and
    said magnetic laminations comprise, in each lamination plane, a plurality of lamination segments configured to fit between adjacent magnet and wedge locations.

3. A dynamoelectric machine in accordance with claim 2 wherein:
    said rotor core also includes an end lamination of non-magnetic material at each end of said stack that has notches for receiving said wedges, and said magnets abut against said end laminations; and
    said rotor bead welds secure said end laminations with said other laminations.

4. A dynamoelectric machine in accordance with claim 3 wherein:
    said rotor bead welds are the sole metallurgical bond securing said core, including said laminations, said magnets and said wedges into a unit.

5. A dynamoelectric machine in accordance with claim 1 wherein:
    said stator comprises a magnetic core with a plurality of longitudinally running coil slots within the inner surface thereof and a coil winding disposed in said slots; and
    said rotor bead welds are spaced from each other by a distance equivalent to the stator slot pitch to minimize current flow from voltages induced in said welds.

6. A dynamoelectric machine in accordance with claim 5 wherein:
    said plurality of laminations of said rotor core have on their outer surface longitudinally running depressions in which said bead welds are disposed to avoid raised material in the air gap.

* * * * *